Patented July 19, 1949

2,476,450

UNITED STATES PATENT OFFICE 2,476,450

PROCESS FOR PREPARING A DRY ROSIN SIZE

Bert M. Morris, Wilmington, Del., assignor to Hercules Powder Company, Wilmington, Del., a corporation of Delaware No Drawing. Application March 5, 1946, Serial No. 652,217

5 Claims. (Cl. 260—105)

This invention relates to dry rosin size, and in particular concerns dry saponified rosin size having improved stability against atmospheric oxidation.

As is well known, rosin size may be prepared and utilized either in dry form or as a liquid or paste in admixture with water. The dry form, however, is in general deemed the most satisfactory because of its ease and economy of shipment, the type prepared by spray-drying saponified or partially saponified rosin being especially desirable by reason of its ease of handling at the paper mill and high dispersibility in water.

The dry forms of rosin size, particularly the type formed by spray-drying, however, suffer from one disadvantage in that they have a strong tendency to oxidize and spontaneously decompose in the presence of air. Where, as is not uncommon, some free rosin is present in the size, there is even a greater tendency to oxidize. Such oxidation and consequent heating are not only highly deleterious to the size itself but also present somewhat of a fire hazard during storage and shipment.

In order to stabilize dry rosin size against such atmospheric oxidation, it has become common practice to incorporate any of a variety of antioxidants or stabilizing agents; e. g., phenyl-beta-naphthylamine, diphenylamine, azobenzene, N-cyclohexyl-phenylamine, etc., with the size during or subsequent to its manufacture. Such stabilized rosin sizes have proved highly successful and are widely used throughout the paper sizing art, as well as in textile treating and the manufacture of soaps, detergents, emulsions, etc. However, even though the antioxidants are usually employed only in relatively small amounts, they contribute materially to the cost of the size and, of course, are entirely without sizing value.

It has been found that a dry saponified rosin size of improved stability towards oxidation and spontaneous combustion may be obtained by employing as the rosin starting material gum rosin which has been isomerized by acid treatment in the absence of a solvent. More specifically, it has been found that if gum rosin is isomerized by treating in the molten state and in the absence of a solvent with a catalytic amount of sulfuric or paratoluenesulfonic acid, and is thereafter substantially completely saponified with an alkali-metal alkali followed by spray-drying, the resulting rosin size product is considerably more stable towards oxidation than a similar size made from untreated gum rosin.

This improved size may, in some instances, be used as such, but usually it is desirable to incorporate with the size a small amount of an antioxidant, particularly if the size is to be stored for long periods of time at relatively high temperatures as, for example, in warehouses located in a southern climate. The amount of antioxidant necessary to secure the required degree of stability, however, will be much less than that required to impart equivalent stability to ordinary dry size.

The isomerization treatment to which the rosin is subjected prior to saponification to form the dry size provided by the invention is most conveniently carried out batchwise simply by melting the rosin in a suitable reaction vessel, adding from about 0.01% to about 0.10% of concentrated sulfuric or para-toluenesulfonic acid, and thereafter maintaining the rosin at a temperature below about 200° C. until the isomerization is complete. If desired, however, the reaction may be carried out continuously by adding the acid catalyst to the rosin as it is passed in molten condition and in heat-exchange relationship with the hot product into a reaction zone in which the rosin-acid mixture is subjected to the desired temperature for the length of time necessary to effect the isomerization. Similarly, if desired, the reaction may be carried out in an inert atmosphere to prevent oxidation and the formation of color bodies. Other variations in operating technique will be apparent to those skilled in the art.

The progress of the isomerization reaction is characterized by a gradual change in the specific optical rotation of the rosin. Thus, during isomerization as above described, the specific rotation of the rosin, which is usually initially between about $+20°$ and about $+50°$, gradually decreases and approaches a value of between about $-15°$ and about $-20°$. Accordingly, the reaction may be followed and controlled by means of successive measurements of the specific rotation of the rosin undergoing isomerization. The isomerized rosin product is thus differentiated from the heat-treated or decarboxylated rosin known in the art, since the latter is characterized by an increase in specific rotation. Similarly, it differs from the polymerized rosin product obtained by treating rosin with relatively large quantities of aqueous sulfuric acid in the presence of an organic solvent. Such polymerized rosin is essentially a dimeric dicarboxylic acid, whereas isomerized rosin is primarily monocarboxylic and of substantially the same molecular weight as the initial rosin.

The conditions of time and temperature under which the acid isomerization is carried out are interrelated in that they are inversely proportional to each other, and are further dependent upon the proportion of acid catalyst employed and the purity of the rosin starting material. Thus, for example, at a given temperature, a sample of gum rosin containing impurities may require considerably more time for substantially complete isomerization than a relatively pure rosin, since the impurities normally associated with gum rosin usually react with the acid catalyst thereby reducing the concentration of the catalyst. In general, however, the isomerization is carried out employing from about 0.01% to about 0.10% of catalyst, based on the weight of rosin, at a temperature between the melting point of the rosin and about 200° C., preferably from about 140° C. to about 160° C., over a period of time of about 0.5 hour to about 40 hours. Temperatures in excess of about 200° C. must be avoided in order to preclude decarboxylation reactions with the consequent formation of rosin oils which are detrimental to sizing.

The following table will illustrate in a general way the interrelationship between the various conditions affecting the isomerization treatment, and will serve as a guide in carrying out the reaction within the essential operating limitations hereinbefore specified. In each case, the rosin starting material was gum rosin of K color grade, and the times set forth are those necessary to affect isomerization to the extent of about 90% (as determined by optical rotation measurements) at the temperatures indicated.

Table

| Catalyst | | Time at 140° C., hrs. | Time at 150° C., hrs. | Time at 160° C., hrs. |
| --- | --- | --- | --- | --- |
| Name | Conc., percent by Wt. | | | |
| Sulfuric acid | 0.05 | 20–40 | 10–20 | 5–10 |
| Para-toluenesulfonic acid | 0.015 | 20–40 | 10–20 | 5–10 |
| Do | 0.05 | 3–10 | 1–3 | 0.5–1.5 |
| Sulfuric acid | 0.1 | <0.5 | <2 | <2 |

It will be noted that the above data indicate paratoluenesulfonic acid to be a stronger isomerziation catalyst than concentrated sulfuric acid, but the latter is usually preferred by reason of its low cost and ready availability.

The dry rosin size of the present invention is prepared by substantially completely saponifying the isomerized rosin with an aqueous alkali-metal alkali followed by drying of the resulting saponified product according to any of the several processes known in the art. A convenient process of this sort, and one which produces dry size of highly desirable physical characteristics, is that described in United States Letters Patent 2,134,911 to Dreshfield and Johnstone. When proceeding according to this process, the desired quantity of molten isomerized rosin is introduced into an autoclave and heated under pressure to a temperature between about 120° C. and about 200° C. The alkali-metal alkali saponifying agent, preferably sodium hydroxide, in the form of an aqueous solution of about 25% to about 50%, preferably 30%, concentration by weight is then forced into the autoclave while maintaining the mixture at a reaction temperature between about 135° C. and about 200° C. and under its autogenic pressure. The quantity of alkali employed should be just sufficient for substantially complete saponification of the rosin so that the size product is substantially neutral; i. e., contains not more than about 5% by weight of free rosin or more than about 0.2% by weight of free alkali. If it is desired to incorporate an antioxidant with the size, and such will usually be the case, it may conveniently be added to the molten rosin before the saponification takes place. Other modifying agents for the size; e. g., waxes, paraffin oil, etc., may likewise be added to provide special types of size for certain specific applications.

Heating of the mixture of rosin and aqueous alkali is continued until the reaction is complete, after which the mixture is discharged under its own pressure into a drying chamber maintained under atmospheric pressure and at such conditions of temperature and humidity that the mixture is immediately desiccated to a fine dry powder. The conditions maintained within the drying chamber vary somewhat with the water content of the saponified mixture, but when, as is usually the case, this mixture contains about 15% to about 20% water, the chamber should be maintained at a temperature between about 65° C. and about 150° C. and at a relative humidity less than about 78%. Such conditions are conveniently maintained by continuously circulating hot air through the chamber, preferably in a direction countercurrent to the discharge of the mixture from the autoclave.

The dry isomerized rosin size prepared in this manner takes the form of discrete porous particles having a cellular structure and being very readily soluble or dispersible in cold water. It is further characterized by being unusually stable to atmospheric oxidation. Normally it will contain less than about 3% by weight of moisture, and will be substantially neutral, containing less than 1% by weight either of free rosin or free alkali.

The following example will illustrate one way in which the principle of the invention may be applied, but is not to be construed as limiting the same.

*Example*

One thousand parts of centrifuged gum rosin of color grade K and having a specific rotation of +20° was placed in a suitable reaction vessel and melted by heating to a temperature of about 150° C. One part by weight of concentrated sulfuric acid was then added to the molten rosin and heating was continued at 150° C. for 4 hours, at the end of which time a sample of the rosin was found to have a specific rotation of about −15°, thereby indicating that isomerization was substantially complete. The isomerized rosin so prepared was then mixed with 5 parts by weight of phenyl-beta-naphthylamine dissolved in 50 parts by weight of paraffin oil, and was introduced into an oil-jacketed autoclave and heated under autogenic pressure to a temperature of about 160° C. by circulating hot oil through the jacket. Approximately 400 parts by weight of sodium hydroxide in the form of a 30% aqueous solution was then forced in at the bottom of the autoclave. The mixture was heated under its own pressure at 160°–170° C. for 15 minutes, after which it was discharged directly under a pressure of 140 pounds per square inch into a drying chamber maintained at 125° C. and under atmospheric pressure.

The size product prepared according to the example was a light dry powder almost identical in apearance with a comparative product made from gum rosin which had not been isomerized. With respect to atmospheric oxidation, however, the isomerized rosin size was more than twice as stable as the ordinary size, as indicated by the manometric oxygen demand test. In such test, a sample of the size to be tested is placed in a flask which is immersed in an oil bath at a temperature of about 120° C. and which is fitted with a mercury manometer. The flask is evacuated for about 30 minutes to remove any surface moisture from the size sample, after which it is filled with oxygen under a pressure of one atmosphere. The size is allowed to stand in contact with the oxygen for a period of 170 minutes, after which the pressure within the flask is read from the manometer. The pressure drop, expressed in centimeters of mercury, is termed the manometric oxygen demand value, and is an accurate measure of the tendency of the size sample to oxidize in the air. When subjected to this test, the size made according to the example had an oxygen demand value of 2.25, whereas the comparative size made from nonisomerized rosin had an oxygen demand value of 6.0.

Other modes of applying the principle of this invention may be employed instead of those explained, change being made as regards the materials or conditions employed, provided the materials and conditions stated by any of the appended claims be employed.

What I claim and desire to protect by Letters Patent is:

1. The method of making a dry substantially neutral saponified rosin size having improved resistance to atmospheric oxidation which consists in isomerizing gum rosin by treating said rosin in the absence of a solvent with between about 0.01% and about 0.10% by weight of an isomerization catalyst selected from the group consisting of sulfuric acid and para-toluenesulfonic acid at a temperature between the melting point of the rosin and about 200° C. until the rosin is substantially completely isomerized, heating the isomerized rosin with an aqueous alkali-metal alkali in an amount sufficient to produce a substantially neutral saponification product at a temperature between about 135° C. and about 200° C. and under autogenic pressure, and thereafter discharging the saponified mixture at said temperature and under said pressure into a drying zone maintained at substantially atmospheric pressure.

2. The method of making a dry substantially neutral saponified rosin size having improved resistance to atmospheric oxidation which consists in isomerizing gum rosin by treating said rosin in the absence of a solvent with between about 0.01% and about 0.10% by weight of concentrated sulfuric acid at a temperature between the melting point of the rosin and about 200° C. until the rosin is substantially completely isomerized, heating the isomerized rosin with an aqueous alkali-metal alkali in an amount sufficient to produce a substantially neutral saponification product at a temperature between about 135° C. and about 200° C. and under autogenic pressure, and thereafter discharging the saponified mixture at said temperature and under said pressure into a drying zone maintained at substantially atmospheric pressure.

3. The method of making a dry substantially neutral saponified rosin size having improved resistance to atmospheric oxidation which consists in isomerizing gum rosin by treating said rosin in the absence of a solvent with between about 0.01% and about 0.10% by weight of concentrated sulfuric acid at a temperature between the melting point of the rosin and about 200° C. until the rosin is substantially completely isomerized, heating the isomerized rosin with aqueous sodium hydroxide in an amount sufficient to produce a substantially neutral saponification product at a temperature between about 135° C. and about 200° C. and under autogenic pressure, and thereafter discharging the saponified mixture at said temperature and under said pressure into a drying zone maintained at substantially atmospheric pressure.

4. The method of making a dry substantially neutral saponified rosin size having improved resistance to atmospheric oxidation which consists in isomerizing gum rosin by treating said rosin in the absence of a solvent with between about 0.01% and about 0.10% by weight of concentrated sulfuric acid at a temperature between about 140° C. and about 160° C. until the rosin is substantially completely isomerized, heating the isomerized rosin with aqueous sodium hydroxide in an amount sufficient to produce a substantially neutral saponification product at a temperature between about 135° C. and about 200° C. and under autogenic pressure, and thereafter discharging the saponified mixture at said temperature and under said pressure into a drying zone maintained at substantially atmospheric pressure.

5. The method of making a dry substantially neutral saponified rosin size having improved resistance to atmospheric oxidation which consists in isomerizing gum rosin by treating said rosin in the absence of a solvent with between about 0.01% and about 0.10% by weight of concentrated sulfuric acid at a temperature between about 140° C. and about 160° C. until the rosin is substantially completely isomerized, heating the isomerized rosin with aqueous sodium hydroxide in an amount sufficient to produce a substantially neutral saponification product and phenyl-beta-naphthylamine in an amount sufficient to render said saponification product substantially resistant to oxidation, said heating being carried out at a temperature between about 135° C. and about 200° C. and under autogenic pressure, and thereafter discharging the saponified mixture at said temperature and under said pressure into a drying zone maintained at substantially atmospheric pressure.

BERT M. MORRIS.

REFERENCES CITED

The following references are of record in the file of this patent:

UNITED STATES PATENTS

| Number | Name | Date |
|---|---|---|
| 1,999,812 | Humphrey | Apr. 30, 1935 |
| 2,134,911 | Dreshfield | Nov. 1, 1938 |
| 2,239,555 | Fleck et al. | Apr. 22, 1941 |
| 2,294,723 | Dreshfield | Sept. 1, 1942 |
| 2,299,577 | Hasselstrom et al. | Oct. 20, 1942 |
| 2,437,643 | Houpt | Mar. 9, 1948 |